Feb. 2, 1943.   R. A. QUINTIN ET AL   2,309,787
DUMP TRUCK
Filed Jan. 26, 1942   3 Sheets-Sheet 1

INVENTORS
E. W. Graham
R. A. Quintin
BY
ATTORNEYS

Feb. 2, 1943.    R. A. QUINTIN ET AL    2,309,787
DUMP TRUCK
Filed Jan. 26, 1942    3 Sheets-Sheet 3

INVENTORS
E.W. Graham
R.A. Quintin
BY
ATTORNEYS

Patented Feb. 2, 1943

2,309,787

UNITED STATES PATENT OFFICE 2,309,787

DUMP TRUCK

Roger A. Quintin and Emery W. Graham, Stockton, Calif.

Application January 26, 1942, Serial No. 428,192

11 Claims. (Cl. 298—20)

This invention relates in general to an improvement in dump trucks, and in particular the invention is directed to a unique arrangement for mounting and dumping the carrying body.

As at present constructed dump trucks are provided with a separate frame on which the carrying body is pivoted for upward swinging movement to a dumping position; this upward movement usually being accomplished by means of a costly hydraulic lift assembly.

It is the principal object of this invention to provide a dump truck which does not embody a separate supporting frame for the body, and which employs a simplified lift assembly; this dump truck as compared with those now in use being substantially reduced in overall height and weight by virtue of the invention.

Another object of the invention is to provide a dump truck whose wheel base shortens when the carrying body tilts upward to dump, thus facilitating dumping over a fill, and especially where the truck must turn and back to the dumping edge.

A further object of the invention is to provide a dump truck which can be constructed to carry a maximum load without undue length as the depth of the body can be relatively great without undue height; the elimination of the separate or sub-frame permitting lowering of the body.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
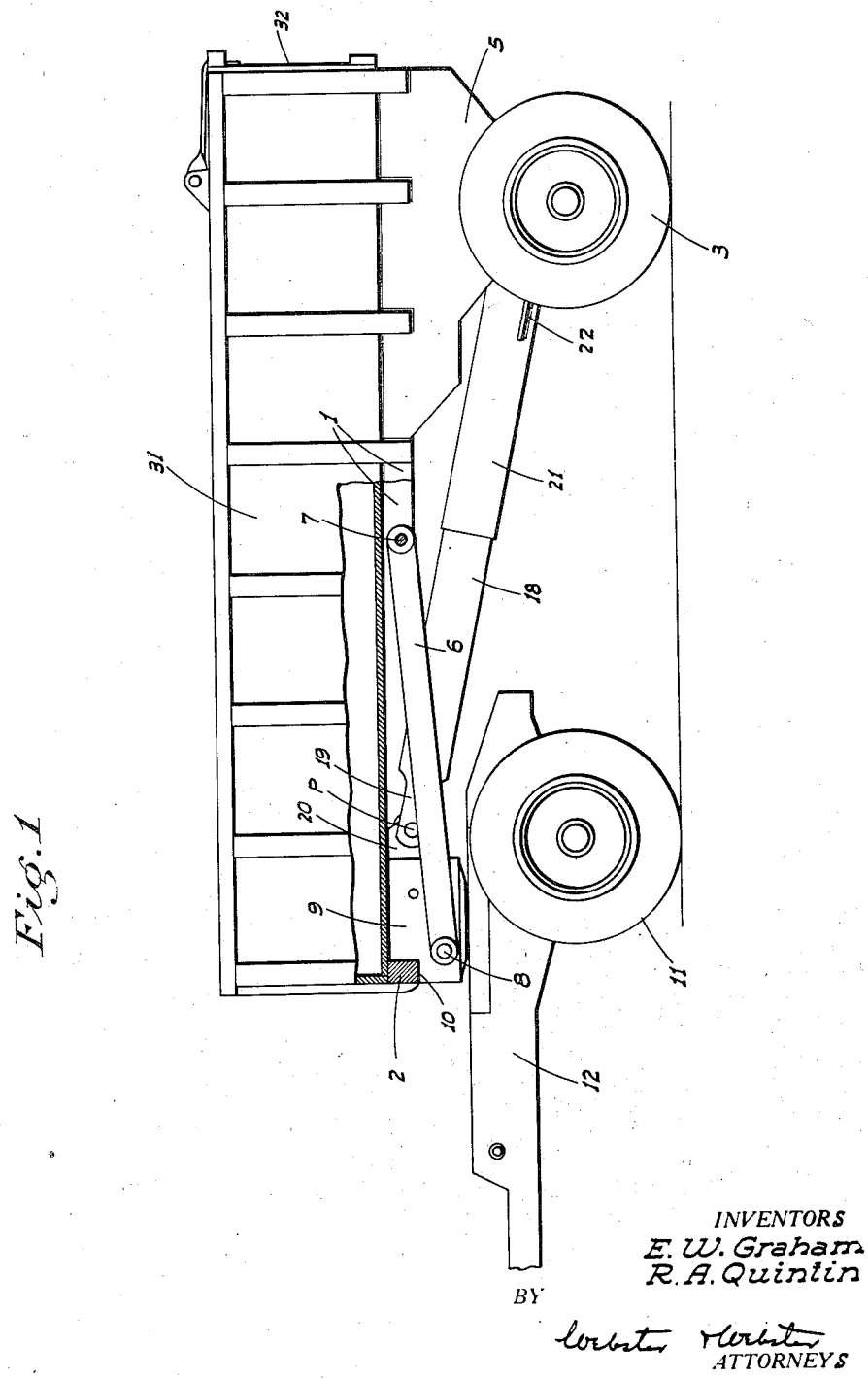
Figure 1 is a side elevation partly in section of the dump truck in carrying position.

Referring now more particularly to the characters of reference on the drawings, the dump truck comprises a rigid frame including parallel side beams 1 connected together at longitudinally spaced points by cross beams 2. Adjacent its rear end the frame is supported by wheels 3 carried on an axle 4; there being suitable transversely spaced members 5 fixed on and depending from the frame to pivotal connection with the axle whereby the frame may tilt upwardly and rearwardly about the axle as an axis.

A pair of heavy duty links 6 are pivoted at their rear end on a cross shaft 7 extending between side beams 1 intermediate the ends of the latter; said links being disposed adjacent but inwardly of said side beams and projecting forwardly to a termination adjacent but short of the forward end of the frame.

At their forward ends the links 6 are pivoted on a cross shaft 8 which projects on opposite sides of a head or block 9. This block includes an upwardly facing shoulder or ledge 10 on which the forward cross beam 2 of the frame normally seats.

The head 9 is supported by a wheeled truck which includes wheels 11, side frames 12, and a cross plate 13 connecting the side frames. The connection between the head 9 and the wheeled truck is in the nature of a fifth wheel, but also permits of a certain amount of vertical swivel action. This connection may include a downwardly extending semi-spherical portion 14 seated in an upwardly opening socket 15 in cross plate 13. Portion 14 is prevented from escape from the socket in any suitable manner, as by a tubular member 16 projecting axially and downward in loose play relation through the bottom of socket 15 to an outwardly flanged termination 17 therebelow, the flanged portion riding a surface symmetrical to the surface of portion 14.

The wheeled truck which supports the forward end of the main frame is preferably the rear portion of a self-powered vehicle such as is commonly used in connection with semi-trailers.

A longitudinally extending telescopic unit connects between the block 9 and rear end of the main frame; such unit comprising one tubular section 18 having forwardly projecting ears 19 pivoted on a cross pin P extending between corresponding rearwardly projecting ears 20 on block 9 some distance above plate 13. The other or rear tubular section 21 terminates at its rear end above and rearwardly of axle 4, and is turnably mounted for rotation about axle 4 as an axis by means of rearwardly diverging plates 22. This telescopic unit extends at a downward slope from block 9.

A block and tackle assembly 23 is disposed mainly within the telescopic unit and includes one sheave block 24 secured on the rear end portion of section 21, while the sheave 24a at the other end is carried on cross pin P. One lead of the block and tackle assembly is dead-ended within section 18 at 25 while the free lead 26 passes over a pulley 27 mounted between ears 20 so that such lead may pass downward through an axial bore 28 in block 9. Below bore 28 and tubular member 16, lead 26 engages a direction-changing pulley 29 and thence extends forward to a windlass 30 which is actuated in any suitable manner.

The material receiving body 31 is formed in unitary non-separable relation with the main frame, and includes a hinged gate 32 at the rear end.

Operation

Figure 2:
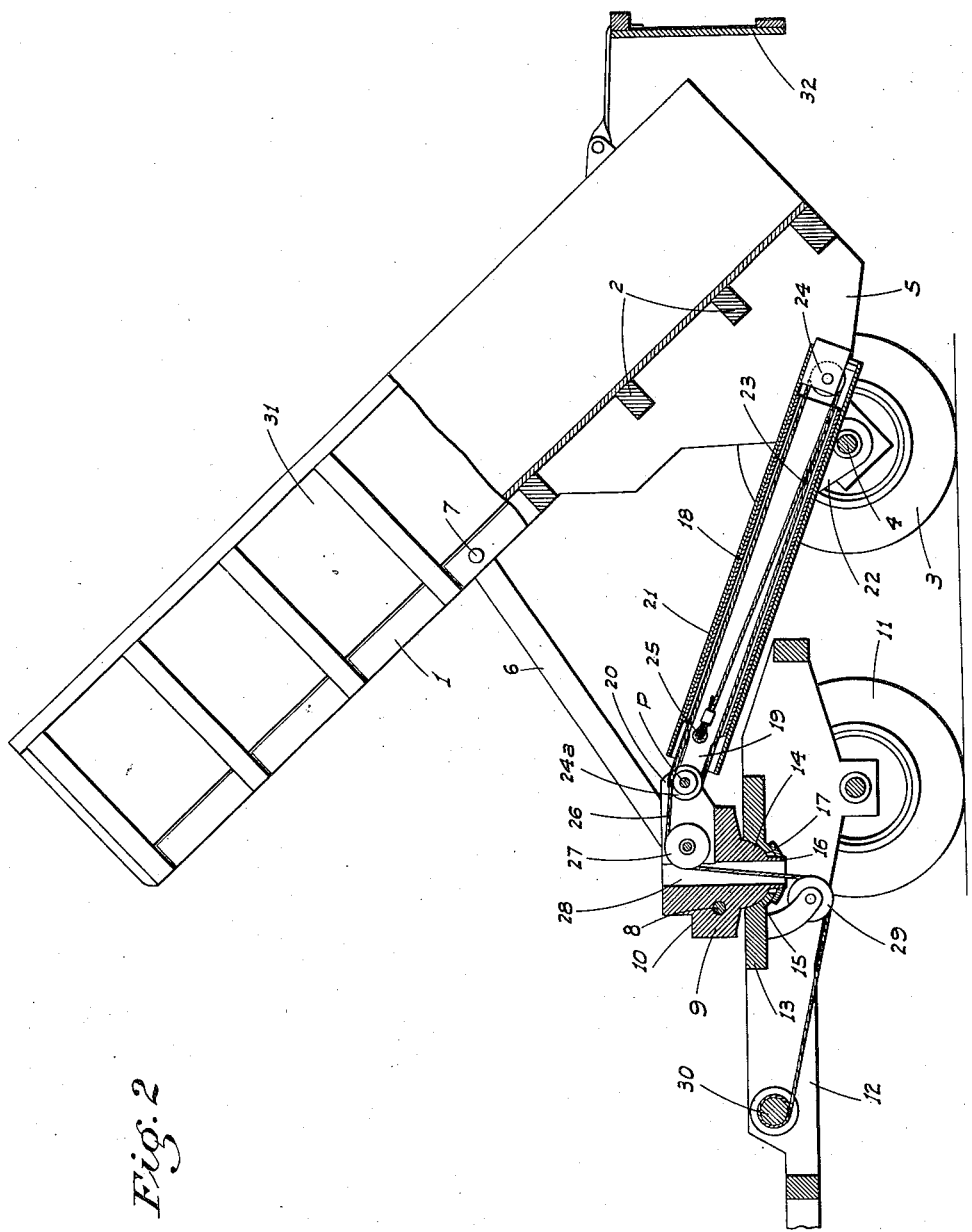
Figure 2 is a sectional elevation of the dump truck in discharging position.
Figure 3:
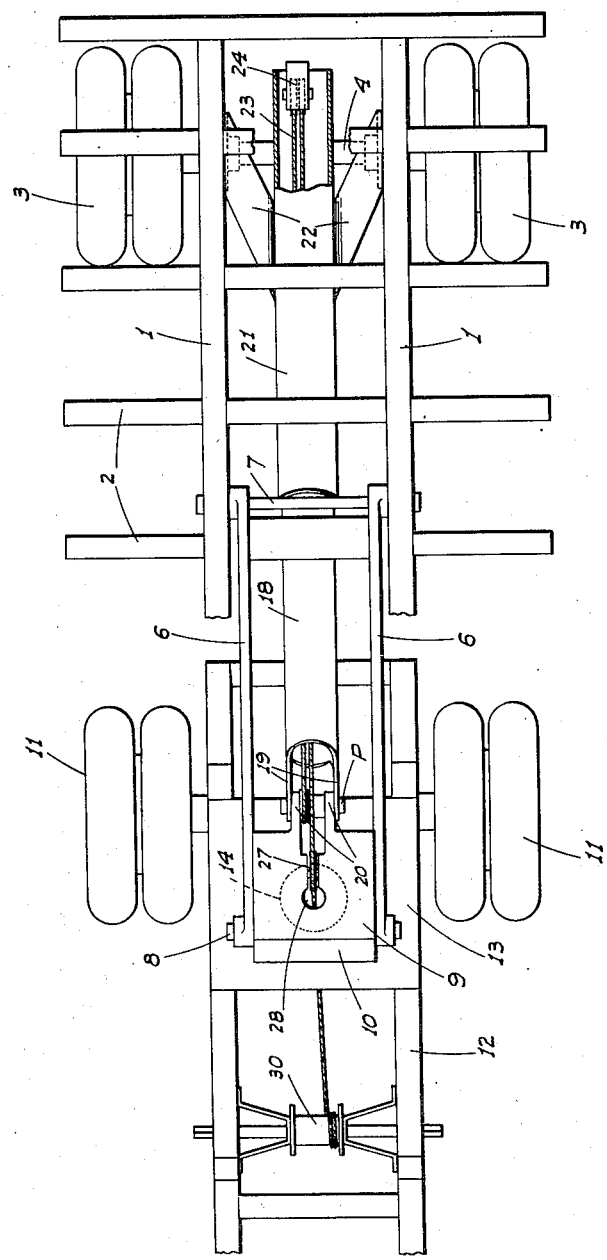
Figure 3 is a plan view of the chassis with the truck-body frame beams broken away at the forward end.

In carrying position the body 31 and included main frame are substantially horizontal and the telescopic unit is extended. To dump the load, the windlass 30 is operated in a direction to shorten the block and tackle assembly and consequently telescope sections 18 and 21. When this occurs it causes relative approaching movement of supporting wheels 3 and 11, and substantially reduces the wheel base of the dump truck. This in turn effects an upward swinging movement of the main frame and body 31 about rear axle 4 as an axis. As the links 6 are rigid, the body and links buckle upward relative to each other and the body is thus positively raised to dumping position, as shown in Fig. 2, when the wheel base shortens.

As the wheel base shortens when the vehicle is in dumping position, the vehicle is greatly increased in maneuverability and can dump its load in areas where a full length truck could not successfully operate. It should also be noted that lead 26 is not effected by relative turning of the forward wheeled truck as such lead passes substantially axially through the fifth wheel assembly.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A dump truck comprising a body including a rigid frame, forward and rear wheel assemblies normally supporting the body in carrying position, the body being separate from the forward wheel assembly and mounted on the rear wheel assembly for upward and rearward swinging movement to dumping position, transversely spaced, longitudinally extending draft links pivoted at their forward ends on the forward wheel assembly and pivoted at their rear ends on the body frame, and telescopic means connected between the wheel assemblies and arranged to effect relative approaching movement thereof; said draft links being operative upon approaching movement of said wheel assemblies to so swing the body.

2. A dump truck comprising a body including a rigid frame, forward and rear wheel assemblies normally supporting the body in carrying position, the body being separate from the forward wheel assembly and mounted on the rear wheel assembly for upward and rearward swinging movement to dumping position, transversely spaced, longitudinally extending draft links pivoted at their forward ends on the forward wheel assembly and pivoted at their rear ends on the body frame, and a block and tackle unit connected between the wheel assemblies and arranged to shorten the wheel base of the dump truck; said draft links being operative upon shortening of the wheel base to so swing the body.

3. A dump truck comprising a body including a rigid frame, forward and rear wheel assemblies normally supporting the body in carrying position, the body being separate from the forward wheel assembly and mounted on the rear wheel assembly for upward and rearward swinging movement to dumping position, transversely spaced, longitudinally extending draft links pivoted at their forward ends on the forward wheel assembly and pivoted at their rear ends on the body frame, a tubular, telescopic unit connected between the wheel assemblies, and a block and tackle unit disposed in the telescopic unit and arranged to telescope the latter and shorten the wheel base of the dump truck; said draft links being operative upon shortening of the wheel base to so swing the body.

4. A dump truck comprising a body having a frame, forward and rear wheel assemblies normally supporting the body in carrying position, the body being separate from the forward wheel assembly and being mounted on the rear wheel assembly for upward and rearward tilting movement to dumping position, longitudinally extending draft links pivoted at their forward end on the forward wheel assembly and pivoted at their rear end on the body frame, a telescopic unit comprising a pair of members connected between the wheel assemblies, means connecting the members to telescope the unit and thus shorten the wheel base of the dump truck, the draft links being operative upon shortening of the wheel base to so swing the body; said telescopic unit extending at an upward and forward slope from its rear end, and the draft links extending at an upward and rearward slope from their forward end.

5. A dump truck as in claim 4, in which the upper end of said unit is pivoted in connection with the forward wheel assembly a substantial distance ahead of the rear ends of said links.

6. A dump truck comprising a body having a frame, forward and rear wheel assemblies normally supporting the body in carrying position, the body being separate from the forward wheel assembly and being mounted on the rear wheel assembly for upward and rearward tilting movement to dumping position, a draft connection between the forward wheel assembly and the body, means to shorten the wheel base of the dump truck; said draft connection being operative upon shortening of the wheel base to so tilt the body, a fifth wheel mechanism carried by the forward wheel assembly, said mechanism including a head member, the forward wheel assembly having horizontal and limited vertical swivel action relative to said head member; the draft connection being attached to said head member and the body frame normally seating thereon.

7. A dump truck comprising a body including a rigid frame, a rear wheel assembly, means mounting the body on the rear wheel assembly in supported relation and for upward and rearward swinging movement, a forward wheel assembly including a fifth wheel mechanism having a head member, said mechanism being arranged to permit of horizontal and limited vertical swivel action of the forward wheel assembly relative to said head member, draft means between the head member and said body frame, the latter normally but separably seating on said head member, and means connected between said wheel assemblies arranged to shorten the wheel base of the dump truck; said draft means being operative upon shortening of the wheel base to so swing the body.

8. A dump truck comprising a body including a rigid frame, a rear wheel assembly, means mounting the body on the rear wheel assembly in supported relation and for upward and rearward swinging movement, a forward wheel assembly including a fifth wheel mechanism having a head member, said mechanism being arranged to permit of horizontal and limited vertical swivel action of the forward wheel assembly relative to said head member, transversely spaced draft links pivotally connected between the head member and said body frame, the latter normally but separably seating on said head member, and contractible means connected between said wheel assemblies arranged to shorten the wheel base of the dump truck; said draft links being operative upon shortening of the wheel base to so swing the body.

9. A dump truck comprising a body including a rigid frame, a rear wheel assembly, means mounting the body on the rear wheel assembly in supported relation and for upward and rearward swinging movement, a forward wheel assembly including a fifth wheel mechanism having a head member, said mechanism being arranged to permit of horizontal and limited vertical swivel action of the forward wheel assembly relative to said head member, transversely spaced draft links pivotally connected between the head member and said body frame, the latter normally but separably seating on said head member, a block and tackle connected between said head member and the rear wheel assembly, and a windlass on the forward wheel assembly, the free lead of the block and tackle being connected with said windlass.

10. A dump truck as in claim 9 in which said fifth wheel mechanism includes an axial bore therethrough; said free lead intermediate its ends passing through said bore, and pulleys at opposite end of the bore over which said lead passes in guided relation.

11. A dump truck as in claim 8 in which said contractible means comprises a tubular section pivoted on the axle of the rear wheel assembly, another tubular section pivoted on said head member, said sections being telescoped, and a block and tackle enclosed within said sections and connected at its ends with corresponding sections; there being a windlass on the dump truck, and the free lead of the block and tackle being connected to said windlass.

EMERY W. GRAHAM.
ROGER A. QUINTIN.